United States Patent
Rehm

(10) Patent No.: US 8,266,992 B2
(45) Date of Patent: Sep. 18, 2012

(54) STEADY REST

(75) Inventor: Fritz Rehm, Oberteuringen (DE)

(73) Assignee: SMW-Autoblok Spannsysteme GmbH (DE)

( * ) Notice: Subject to any disclaimer, the term of this patent is extended or adjusted under 35 U.S.C. 154(b) by 1137 days.

(21) Appl. No.: 12/151,561

(22) Filed: May 7, 2008

(65) Prior Publication Data

US 2008/0289463 A1 Nov. 27, 2008

(30) Foreign Application Priority Data

May 26, 2007 (EP) .................................... 07010544

(51) Int. Cl.
*B23Q 1/25* (2006.01)
*B24B 41/06* (2006.01)
*B23B 25/00* (2006.01)

(52) U.S. Cl. .............................. 82/157; 82/162; 451/408

(58) Field of Classification Search ............ 82/162–164, 82/157; 451/365, 398, 406, 408
See application file for complete search history.

(56) References Cited

U.S. PATENT DOCUMENTS

| | | | | |
|---|---|---|---|---|
| 1,961,091 A * | 5/1934 | Smith et al. | ...................... | 82/162 |
| 2,141,596 A * | 12/1938 | Crompton, Jr. | ................ | 451/408 |
| 2,451,705 A * | 10/1948 | Sandford | ..................... | 279/4.12 |
| 3,176,330 A * | 4/1965 | Jennings | .......................... | 408/57 |
| 3,230,802 A * | 1/1966 | Johnson | ........................... | 82/158 |
| 3,535,963 A | 10/1970 | Dietl | | |
| 3,771,392 A * | 11/1973 | Johnson | ........................... | 82/157 |
| 4,416,174 A * | 11/1983 | Owsen | .............................. | 82/162 |
| 4,519,279 A * | 5/1985 | Ruggeri | .......................... | 82/162 |
| 4,546,681 A * | 10/1985 | Owsen | .............................. | 82/162 |
| 4,754,673 A * | 7/1988 | Hiestand | ........................... | 82/164 |
| 6,458,022 B1 * | 10/2002 | Folz | ................................ | 451/365 |
| 6,505,533 B2 * | 1/2003 | Kroisandt | .......................... | 82/53 |
| 7,597,035 B2 * | 10/2009 | Rehm | ............................... | 82/157 |
| 2001/0018323 A1 * | 8/2001 | Mulroy et al. | ................ | 451/406 |
| 2002/0029668 A1 * | 3/2002 | Kroisandt | .......................... | 82/53 |
| 2009/0001643 A1 * | 1/2009 | Rehm | ............................... | 269/55 |

FOREIGN PATENT DOCUMENTS

| | | |
|---|---|---|
| DE | 35 44 961 | 7/1987 |
| DE | 200 12 710 | 11/2000 |
| DE | 199 50 706 | 5/2001 |

* cited by examiner

*Primary Examiner* — Boyer D Ashley
*Assistant Examiner* — Sara Addisu
(74) *Attorney, Agent, or Firm* — Pandiscio & Pandiscio

(57) ABSTRACT

A steady rest for clamping of rod-shaped workpieces, the steady rest including three holding elements, including two outer holding elements adapted to be swivelled about a pin mounted in a housing and a middle holding element adapted to be adjusted axially, and in which coolant or lubricant can be carried to a workpiece by means of ducts in the housing and the middle holding element. The ducts provided in the housing and in the middle holding element, being connected to a cavity and the ducts being connected together by a deformable flexible high-pressure hose. The ducts being connected together by means of the elastically deformable element.

7 Claims, 3 Drawing Sheets

STEADY REST

BACKGROUND OF THE INVENTION

1. Field of the Invention

The present invention relates to a steady rest for central clamping of rod-shaped workpieces with a circular diameter on a lathe with three holding elements arranged in the same plane and provided with rollers, of which the two outer holding elements can be swivelled about an articulated pin mounted in a housing and the middle holding element can be adjusted in a straight line in relation to the workpiece, with the ability to supply coolant or lubricant to the workpiece by means of ducts worked into the housing and the holding elements.

2. Description of the Prior Art

In steady rests of this kind, the coolant or lubricant flows to the middle holding element directly through a duct worked into the housing or a housing cover and this duct opens into a slot-shaped recess also provided in the housing. In this case, a further duct worked into the adjustable middle holding element is connected to the recess, which is sealed all the way around by means of a seal inserted in the housing or the housing cover.

Although this supply of coolant and/or lubricant to the roller of the middle holding element or the workpiece has proven effective, the adjustment movements of the middle holding element can cause the seal around the recess to become damaged after a relatively short time, with the effect that coolant or lubricant can emerge from the recess and get into the inside of the steady rest housing. Not only does this impair the lubrication of the adjustable components and their function, it can also lead to rust on the control cams and other locations, meaning that the required high level of clamping accuracy of the steady rest is no longer provided.

SUMMARY OF THE INVENTION

It is therefore the task of the present invention to design the steady rest of the aforementioned kind in such a way that leak-free supply of coolant or lubricant into the middle holding element is guaranteed. In this case, seals should not be stressed by moving components, but instead a continuously leak-tight connection between a locationally fixed component and an adjustable component should be provided so that the supply of coolant or lubricant does not cause any malfunctions of the steady rest and that, in contrast, a long service life is guaranteed. The construction complexity required in order to achieve this should be kept to a low level whilst nevertheless providing a reliable operating method at all times.

In accordance with the present invention, this is achieved in a steady rest of the aforementioned type in that a leak-tight supply of coolant and/or lubricant into the middle holding element is provided because a cavity is worked into the housing and/or a housing cover, that the ducts worked into the housing and/or the housing cover as well as into the middle holding element are connected to the cavity and that the ducts that open out into the cavity are connected together by means of an elastically deformable element.

In this case, the duct worked into the housing or the housing cover and opening out into the cavity can open out into the cavity approximately perpendicular or parallel to the axis of the adjustable holding element, and if the duct emerges approximately at right angles into the cavity then the length of the elastically deformable element should be slightly greater than the maximum distance between the two ducts to be connected. Also the duct should be arranged approximately at the level of the middle of the adjustment travel of the middle holding element. If the duct worked into the housing and/or the housing cover runs approximately in parallel to the axis then the elastic element can take a meandering path into the cavity.

The cross-sectional area of the cavity should be approximately rectangular and a flexible high-pressure hose or a bellows can be provided as the elastic element.

In accordance with a different embodiment, in order to carry the coolant and/or lubricant into the middle holding element without leaks, it is possible for a middle piece of the steady rest attached to the middle holding element and preferably provided with a control cam to have a rigid connection element, e.g. in the form of a tube, attached to it in a leak-tight connection, with the connection element running in parallel to the axis of the middle holding element (4) and passing through the housing or a housing cover and having one end connected to the duct worked into the middle holding element and its other end connected to an elastically deformable element, e.g. a high-pressure hose or bellows. In this case, the adjustment range of the elastically deformable element should at least correspond to the adjustment travel of the connection element.

In accordance with a further embodiment, in order to carry the coolant or lubricant into the middle holding element without leaks, an actuator is provided that acts on the middle holding element and is formed as a piston inserted in a cylinder and has a preferably centrally arranged supply duct that is connected to the duct worked into the middle holding element, and a rigid intermediate element, e.g. in the form of a tube, can be inserted into the end wall of the cylinder and engage in the supply duct in a telescopic way providing a leak-tight connection.

If a steady rest is configured in accordance with the present invention, all of the embodiment variants guarantee that there is no leakage when coolant or lubricant is supplied to the roller arranged in the middle holding element or the clamped workpiece. The locationally fixed connections are attached to the components that can be moved relative to them in a leak-proof connection for the supply of coolant or lubricant, and are connected to one another by an elastic element, therefore it is assured that none of the coolant or lubricant being supplied will be able to leak out and get into the housing of the steady rest.

As a result, malfunctions due to coolant or lubricant penetrating the inside of the steady rest housing, in particular clamping inaccuracies due to rust deposits on the control cams of the middle piece, are reliably avoided, which means the steady rest configured in this way can be used without malfunctions for a long period of time. The constructional complexity required in order to achieve leak-free transport is very slight because it is merely necessary to connect the two connections together, for example by means of a hose or a bellows. In addition, accommodating the connection elements directly in the steady rest housing does not require any additional space and, furthermore, in many cases no seals are required which means the embodiment in accordance with the present invention represents a significant improvement to the operating characteristics of steady rests.

BRIEF DESCRIPTION OF THE DRAWINGS

The drawings shows some sample embodiments of the steady rest configured in accordance with the present invention, the details of which are explained below. In the drawings.

DESCRIPTION OF THE PREFERRED EMBODIMENTS

Figure 1:
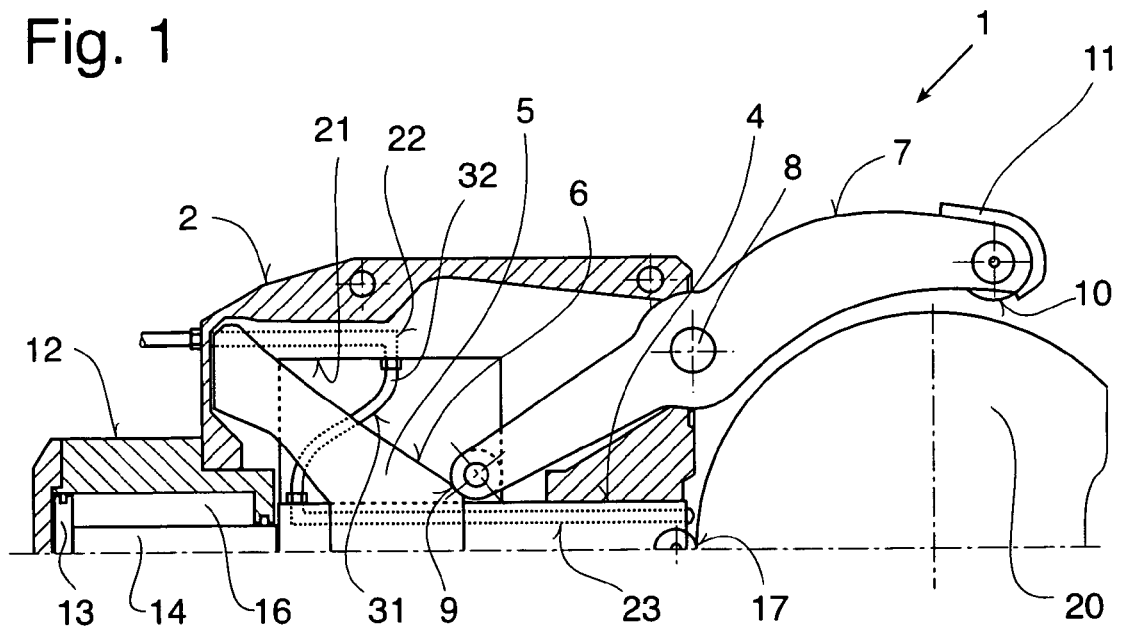
FIG. 1 is a sectional view showing a steady rest with a connection element configured as a hose attached to ducts, for the purpose of carrying coolant or lubricant, in an open operating position.
Figure 2:
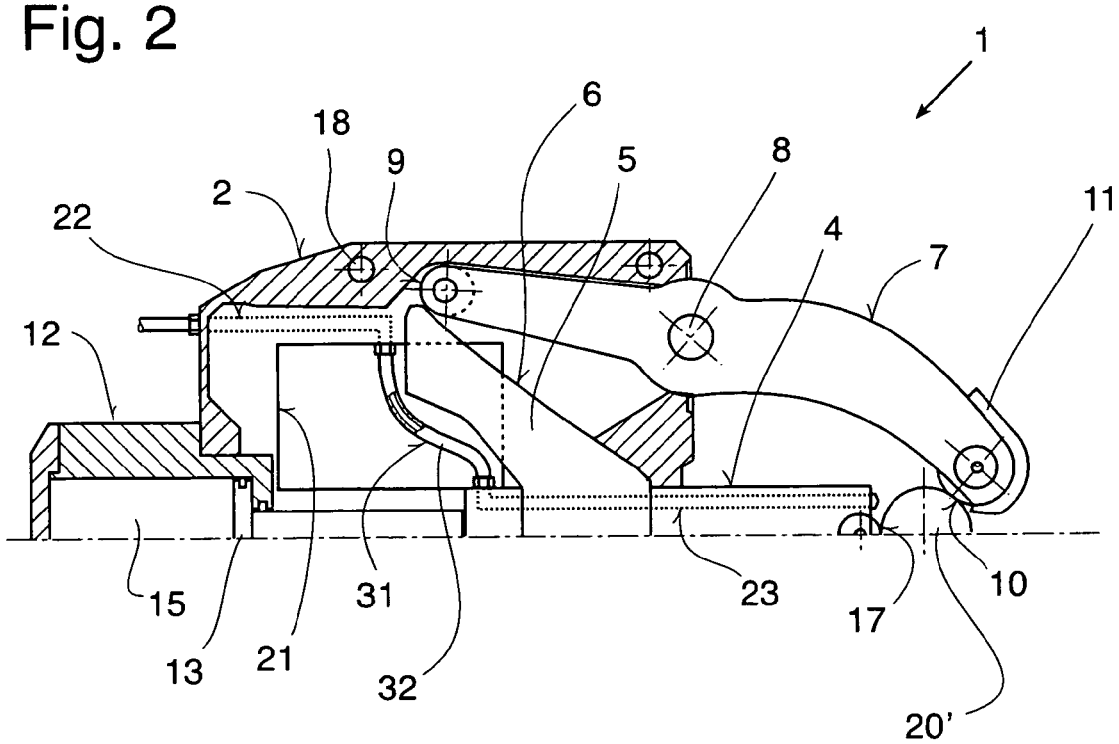
FIG. 2 is a sectional view showing the steady rest in accordance with FIG. 1, in a closed operating position.
Figure 3:
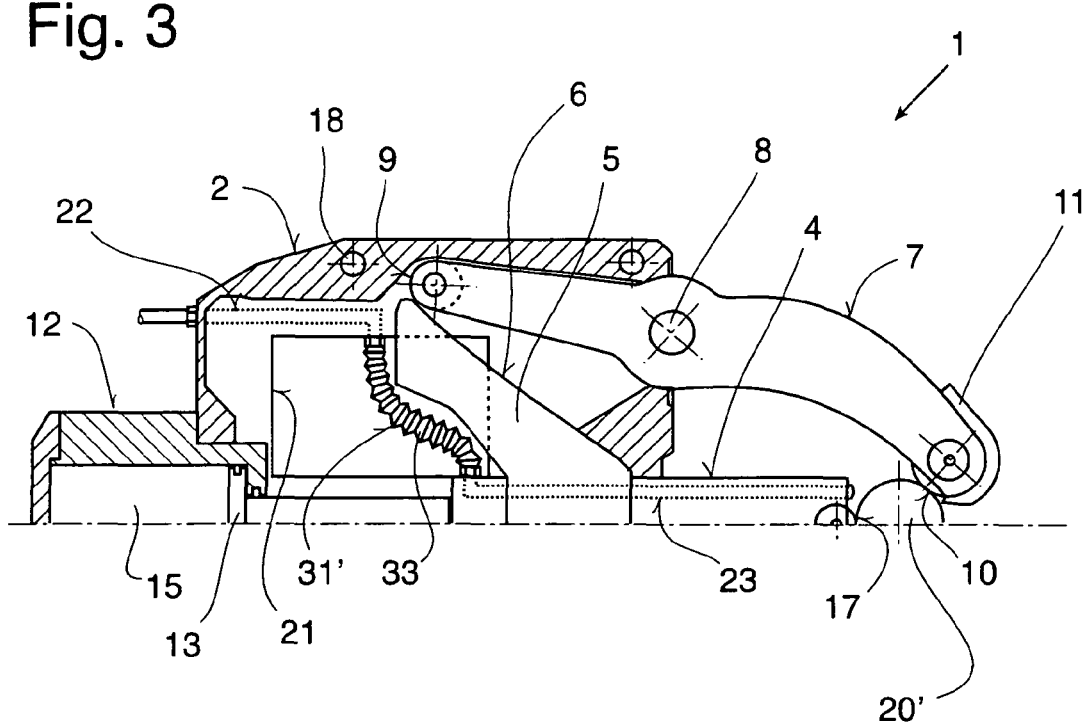
FIG. 3 is a sectional view showing a bellows as a connection element in the steady rest in accordance with FIG. 2.

The steady rest shown in FIGS. 1 to 6 and identified with 1 in each case is used for central clamping of rod-shaped workpieces 20 or 20' on a lathe with three holding elements 4 or 7 arranged in the same plane and provided with rollers 10 or 17. In this case, two outer holding elements 7 can be swivelled about an articulated pin 8 mounted in a housing 2, and a middle holding element 4 can be adjusted in a straight line in relation to the workpiece 20 or 20'. It is possible to supply coolant and/or lubricant to the workpiece 20 or 20' by means of ducts 22, 23 worked into the housing 2 and the holding elements 4, 7.

In order to actuate the holding elements 4 and 7, a piston 13 is provided that is disposed in a cylinder 12 (FIGS. 1-3) and can be acted on by pressurised fluid, a piston rod 14 connected to the middle holding element 4. In addition, there is a middle piece 5 on the middle holding element 4 and the middle piece 5 is provided with a control cam 6 on each side, with the outer holding elements 7 making contact with the control cams 6 by means of rollers 9. When an adjusting movement occurs with pressurised medium being supplied to a pressure space 16, 15 allocated to the piston 13, involving the middle holding element 4 being moved from the operating position shown in FIG. 1 into the operating position shown in FIG. 2, then the two outer holding elements 7 are swivelled inwards by the control cams 6. In this case, the control cams 6 compensate for the adjustment travels of the outer holding elements 7 due to the swivelling movements about the articulated pins 8 which are longer than the middle holding element 4. When pressurised medium is supplied into the pressure space 16, this causes the holding elements 4 and 7 to be moved.

In order for coolant or lubricant to be supplied to the rollers 10 and/or 17 or to the workpiece 20 or 20', the ducts 22 or 23, and other ducts, are worked into the holding elements 4 and 7 as well as the housing 2. The ducts worked into the outer holding elements 7, which have spray protection caps 11 mounted on them, are not shown in the drawings, however.

To allow the coolant or lubricant to be carried without leaks from the duct 22, worked into the housing 2, into the duct 23, provided in the middle holding element 4, the housing 2 is provided with a cavity 21 to which both ducts 22 and 23 are connected. There is an elastically deformable element 31 configured as a flexible high-pressure hose 32 for connecting the duct 22 with the duct 23. The elastic element 31 therefore compensates for the adjustment travel of the middle holding element 4 whilst nevertheless always providing a leak-tight connection between the two ducts 22 and 23, with the effect that no coolant or lubricant can get into the inside of the housing 2.

Figure 4:
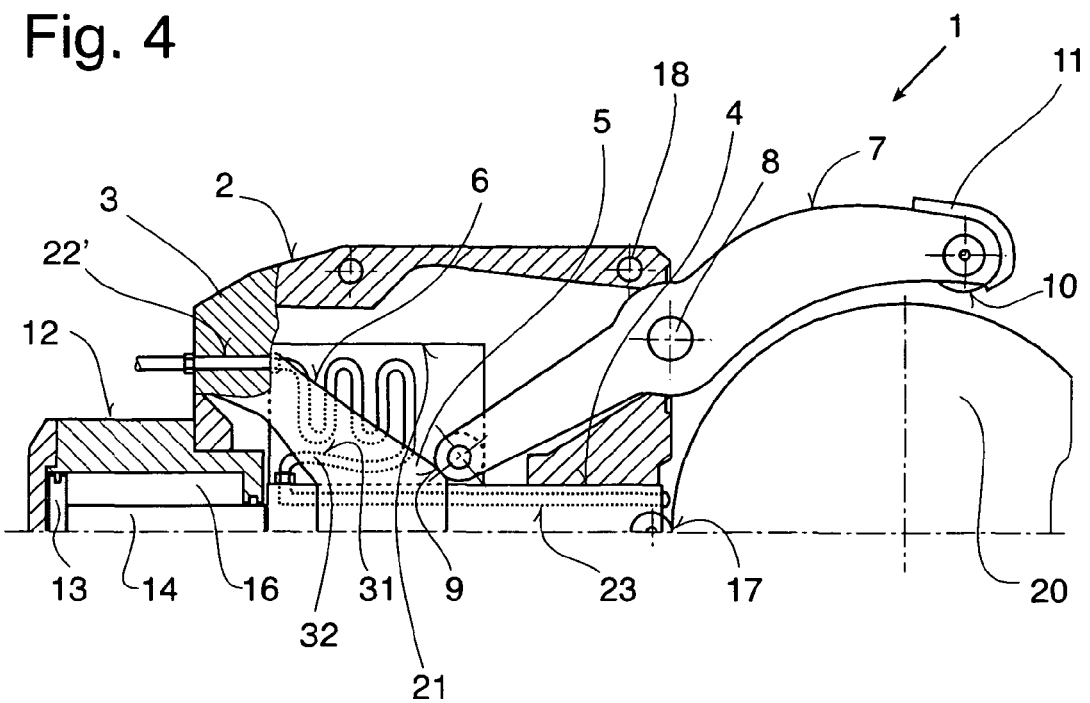
FIG. 4 is a sectional view showing a different arrangement of the connection element in the steady rest in accordance with FIG. 1.

In the embodiment variant shown in FIG. 4, the duct 22' is worked into a cover 3 placed on the housing 2 and secured by bolts that engage in tapped holes 18, in which case the duct 22' runs approximately in parallel to the axis of the adjustment direction of the middle holding element 4. The elastically deformable element 31, on the other hand, consists of the hose 32 which is, however, worked into the cavity 21 in a meandering path, with the effect that the adjustment movements of the middle holding element 4 are compensated.

Figure 5:
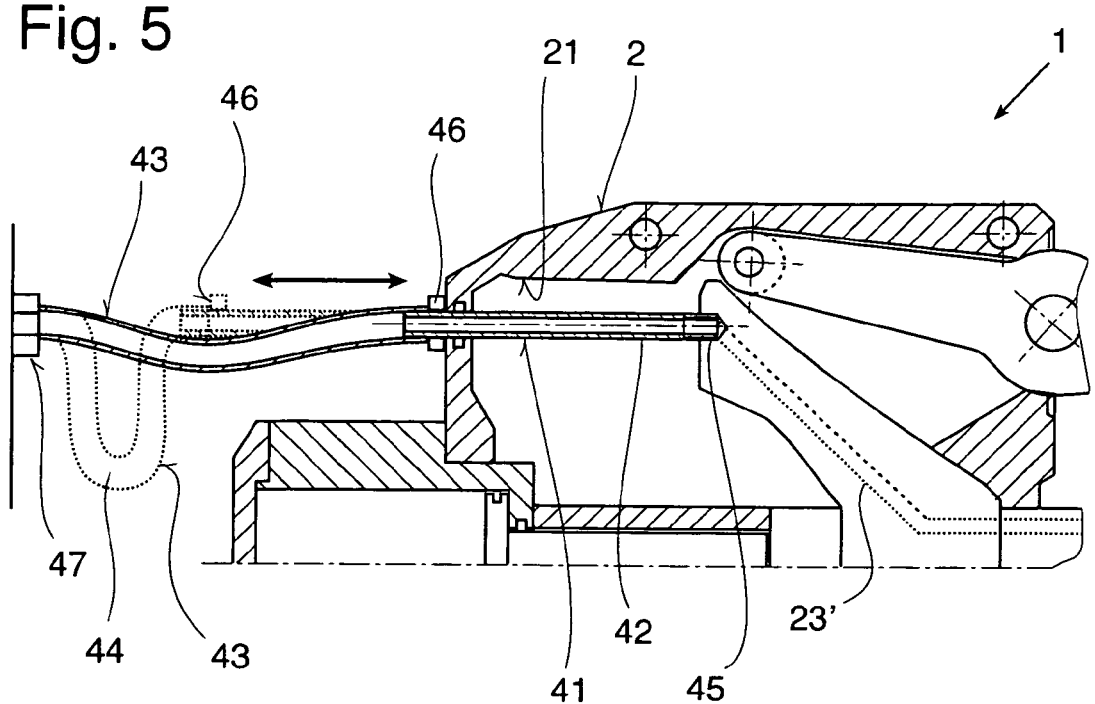
FIG. 5 is a sectional view showing a further embodiment of a steady rest having means for carrying coolant or lubricant into a middle holding element of the steady rest.

In accordance with FIG. 5, a rigid tube 42 is provided as the connection element 31, with the tube 42 screwed into a tapped hole 45 provided in the middle piece 5. The tube 42 in this case passes through the housing 2 and is connected to an elastic element 43 via a connection nipple 46. The elastic element 43 inserted between two connection nipples 46 and 47 is configured as a deformable hose 44, with the effect of eliminating the adjustment movement of the tube 42.

Figure 6:
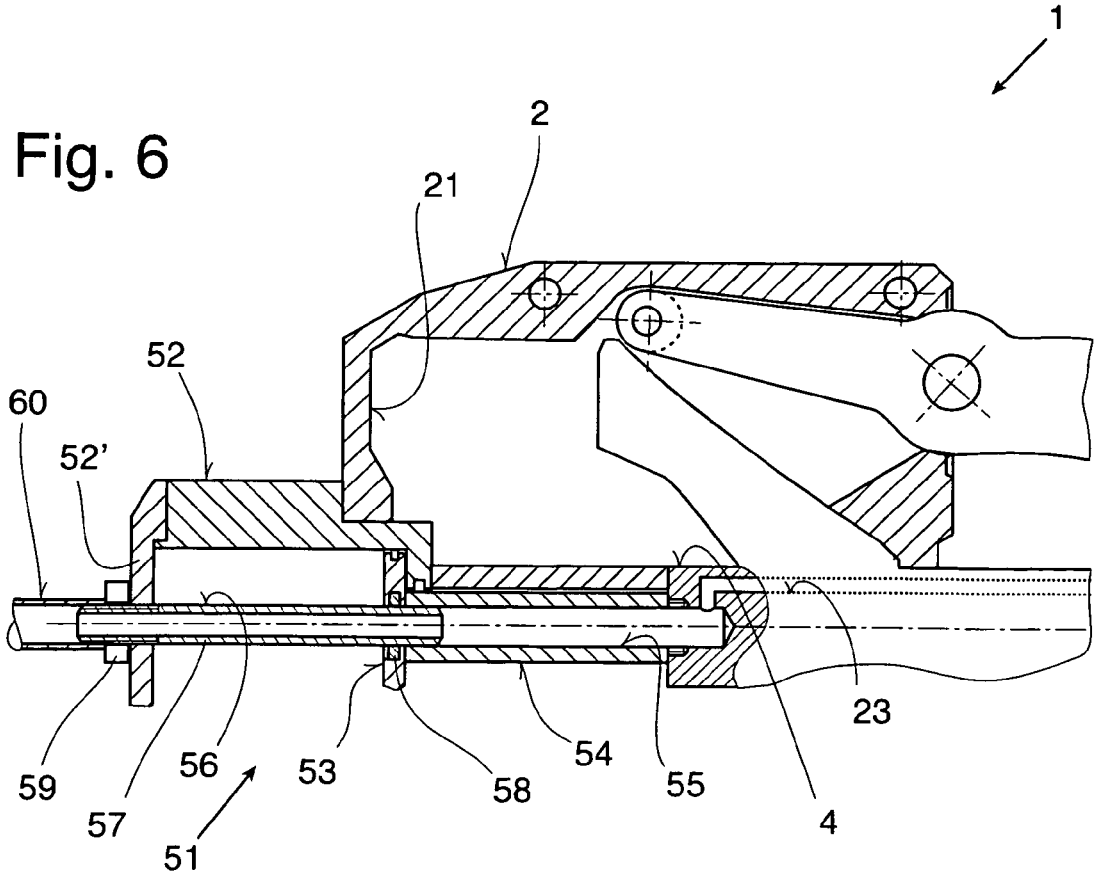
FIG. 6 is a sectional view showing a still further embodiment of a steady rest having means for carrying coolant or lubricant into a middle holding element of the steady rest.

In the embodiment shown in FIG. 6, coolant or lubricant is supplied to the duct 23 worked into the middle holding element 4 by means of an actuator 51 which takes the form of a piston 53 inserted in a cylinder 52. A piston rod 54 of the piston 53, upon which pressurised medium can act from both sides, is screwed into the middle holding element 4 in this case, and is additionally provided with a supply duct 55 into which an intermediate element 56 formed by a rigid tube 57 engages, with the intermediate element 56 attached to the end wall 52' of the cylinder 52. A seal 58 inserted into the piston 53 provides a fluid-tight seal for the passage of the tube 57 through the piston 53. By means of a sealing nipple 59, the coolant or lubricant can be carried from a hose 60 connected to the sealing nipple 59 and into the tube 56.

When adjustment movements of the piston 53 and of the middle holding element 4 connected to the piston 53 take place, the piston rod 54 is pushed against the rigid intermediate element 56, with the effect that a fluid-tight connection is always guaranteed between the hose 60 and the supply duct 55.

The invention claimed is:

1. A steady rest for clamping of rod-shaped workpieces having a circular circumference on a lathe, the steady rest comprising three holding elements arranged in a common plane and provided with rollers, two outer ones of the holding elements being adapted to be swivelled about a pin mounted in a housing, and a middle holding element mounted in the housing and adapted to be movably adjusted axially, the middle holding element having a cam member mounted thereon, the cam member having inclined surfaces adapted to engage an end of each of the holding elements to engage the holding elements with a workpiece, the middle holding element being further adapted to supply coolant and lubricant to the workpiece by means of first and second ducts disposed in the housing and the middle holding element; wherein a leak-tight supply of coolant or lubricant for the middle holding element is provided by the ducts extending through the housing and into the middle holding element, and the ducts are connected together by an elastically deformable element (31, 31') disposed in a cavity in the housing.

2. The steady rest in accordance with claim 1, wherein the first duct extends into the housing and opens into the cavity a selected one of (1) perpendicular to and (2), parallel to, an axis of the middle holding element (4).

3. The steady rest in accordance with claim 2, wherein the first duct emerges at generally a right angle to the middle holding element and into the cavity, the length of the elastically deformable element being greater than a maximum distance between the two ducts.

4. The steady rest in accordance with claim 3, wherein the duct opening in the cavity disposed in the housing is disposed generally at a middle of axial movement of said middle holding element in the cavity.

5. The steady rest in accordance with claim 2, wherein the duct extending into the housing extends generally parallel to the axis of the adjustable holding element, and the elastic element flexibly assumes an interconnecting configuration through the cavity.

6. The steady rest in accordance with claim 1, wherein a cross-sectional area of the cavity is substantially rectangular.

7. The steady rest in accordance with claim 1, wherein the elastically deformable element comprises at least one of a flexible high-pressure hose and a bellows.

* * * * *